United States Patent
Wu et al.

(10) Patent No.: US 12,248,124 B2
(45) Date of Patent: Mar. 11, 2025

(54) VIOLET BLUE GRADIENT COLOR, BLUE LIGHT RESISTANT AND FULL-SCREEN TEMPERED PRIVACY SCREEN PROTECTOR

(71) Applicants: Onemore Technology (Shenzhen) Co., Ltd., Guangdong (CN); Shenzhen Yuantai Film Technology Co., Ltd., Guangdong (CN)

(72) Inventors: Haonan Wu, Guangdong (CN); Guilin Huang, Guangdong (CN)

(73) Assignees: Onemore Technology (Shenzhen) Co., Ltd., Guangdong (CN); Shenzhen Yuantai Film Technology Co., Ltd., Guangdong (CN)

( * ) Notice: Subject to any disclaimer, the term of this patent is extended or adjusted under 35 U.S.C. 154(b) by 551 days.

(21) Appl. No.: 17/722,382

(22) Filed: Apr. 17, 2022

(65) Prior Publication Data

US 2023/0333286 A1    Oct. 19, 2023

(51) Int. Cl.
| | |
|---|---|
| *G02B 1/14* | (2015.01) |
| *C09B 11/20* | (2006.01) |
| *C25D 7/00* | (2006.01) |
| *G02B 1/18* | (2015.01) |
| *G06F 1/16* | (2006.01) |

(52) U.S. Cl.
CPC ............... *G02B 1/14* (2015.01); *C09B 11/20* (2013.01); *C25D 7/00* (2013.01); *G02B 1/18* (2015.01); *G06F 1/1626* (2013.01); *G06F 2200/1634* (2013.01)

(58) Field of Classification Search
CPC .... G02B 1/14; G02B 1/18; C25D 7/00; G06F 1/1626; G02F 2200/1634

USPC ................................................... 359/507, 511
See application file for complete search history.

(56) References Cited

U.S. PATENT DOCUMENTS

| 2016/0135314 A1* | 5/2016 | Ma ..................... H04B 1/3888 |
| | | 428/177 |
| 2022/0276414 A1* | 9/2022 | Wang ..................... G02B 5/021 |

FOREIGN PATENT DOCUMENTS

| CH | 206326966 | * | 7/2017 |
| CN | 206154821 | * | 5/2017 |
| CN | 206170765 | * | 5/2017 |
| CN | 207802009 | * | 8/2018 |

(Continued)

*Primary Examiner* — Ricky D Shafer
(74) *Attorney, Agent, or Firm* — JEEN IP LAW, LLC

(57) ABSTRACT

A violet blue gradient color, blue light resistant and full-screen tempered privacy screen protector, comprising an electroplated oleophobic layer, a diamond explosion-proof layer, a tempered coating, a flexible explosion-proof layer, a silk screen reinforcing layer, a composite violet blue gradient and blue light resistant layer and a privacy protection layer, wherein the composite violet blue gradient and blue light resistant layer comprises a violet blue gradient film and a blue light resistant film. By the nanotechnology used in the present invention, existing spy-proof layers can be coated to be violet blue gradient and blue light resistant layers, and compared with the prior art, the blue light resistant layers can be coated more efficiently and rapidly, so that a plurality of layers are integrated with high efficiencies and yield. The composite violet blue gradient and blue light resistant privacy layer has integrated refraction effects on the basis of existing louver technologies.

7 Claims, 6 Drawing Sheets

(56) References Cited

FOREIGN PATENT DOCUMENTS

CN 210377420 * 4/2020

* cited by examiner

VIOLET BLUE GRADIENT COLOR, BLUE LIGHT RESISTANT AND FULL-SCREEN TEMPERED PRIVACY SCREEN PROTECTOR

BACKGROUND

Technical Field

The present invention relates to the technical field of screen protectors for mobile phones, specifically a violet blue gradient color, blue light resistant and full-screen tempered privacy screen protectors.

Description of Related Art

Currently, owing to popularization and intelligentization of mobile phones, many important data such as payment passwords, and personal photos, are stored in the mobile phones, therefore, people are paying more and more attention on their phone privacy, so that privacy screen protectors are in need to satisfy requirements of users.

In the prior fabrication processes, privacy and blue light resistance effects are achieved by coating a layer of blue light resistant film over the privacy layer, which is of low fabrication efficiencies and a high defective rate. Furthermore, privacy screen protectors currently available are black translucent films, microlouver technology used in privacy screen protectors makes actual viewing effects subject to influences of surrounding environments, so that actual effects are very different from expectation, and fabrication processes are complex and of low efficiencies. What's more, when viewing from either side, the privacy protection film products appear to be black, and as a result, demands to screen protection films of different colors could not be met.

Traditional violet blue gradient color films are made by superimposing two or more resins of different refraction indices for more than 100 layers by fusing and extruding to be composite plastic films. As there are fusion and extrusion processes during fabrication, partial mixing and fusion among different fused masses of resins is liable to occur, interlayer refraction index differences of the violet blue gradient colors are reduced.

SUMMARY

(1) Technical Problems to be Solved

Targeting at deficiencies of the prior fabrication processes, the present invention provides a violet blue gradient color, blue light resistant and full-screen tempered privacy screen protector, which addresses the problems that spy-proof effects of existing mobile phone screen protectors are not satisfactory and fabrication methods thereof are quite complex and low efficient.

(2) Technical Solution

To achieve the foregoing purpose, the present invention provides the following technical solution: a violet blue gradient color, blue light resistant and full-screen tempered privacy screen protector, comprising an electroplated oleophobic layer, a diamond explosion-proof layer, a tempered coating, a flexible explosion-proof layer, a silk screen reinforcing layer, a composite violet blue gradient and blue light resistant layer and a privacy protection layer.

Wherein the composite violet blue gradient and blue light resistant layer comprises a violet blue gradient film and a blue light resistant film.

Wherein fabrication processes of the screen protector are as following:
  step S1: coating the violet blue gradient film over the blue light resistant film with a laminating machine to form a composite violet blue gradient and blue light resistant layer;
  step S2: bonding the composite violet blue gradient and blue light resistant layer with the spy-proof layer with the laminating machine by an optical clear adhesives (OCA);
  step S3: bonding a semi-product obtained in step (S2) respectively with the silk screen reinforcing layer, the flexible explosion-proof layer, the tempered coating, the diamond explosion-proof layer and the electroplated oleophobic layer to form a tempered film;
  step S4: cutting the semi-product obtained in step (S3) to be different dimensions into different phone sizes with a laser machine; and
  step S5: changing a backplane, putting the product into a defoamer to clear bubbles and completing bonding of the product.

Preferably, the electroplated oleophobic layer is an uppermost layer, and a material used for the electroplated oleophobic layer is electroplating anti-fingerprint oil.

Preferably, the electroplated oleophobic layer is provided on an upper surface of the diamond explosion-proof layer, and materials used for the diamond explosion-proof layer are glasses.

Preferably, the diamond explosion-proof layer is provided on an upper surface of the tempered coating, and a material used for the tempered coating is polyethylene terephthalate (PET).

Preferably, the tempered coating is provided on an upper surface of the flexible explosion-proof layer, and materials used for the flexible explosion-proof layer are UV adhesives.

Preferably, the flexible explosion-proof layer is provided on an upper surface of the silk screen reinforcing layer, and materials used for the silk screen reinforcing layer are silk screen paints.

Preferably, the silk screen reinforcing layer is provided on an upper surface of the composite violet blue gradient and blue light resistant layer, wherein the composite violet blue gradient and blue light resistant layer is made by bonding together a violet blue gradient film and a blue light resistant film.

Preferably, the composite violet blue gradient and blue light resistant layer is provided on an upper surface of the spy-proof layer, wherein the spy-proof layer is a microlouver style PET film.

(3) Beneficial Effects

The present invention provides a violet blue gradient color, blue light resistant and full-screen tempered privacy film. And the present invention has the following beneficial effects.
  1. By the nanotechnology used in the present invention, existing spy-proof layers can be coated to be violet blue gradient and blue light resistant layers, and compared with the prior fabrication processes, the blue light resistant layers can be coated more efficiently and rapidly, so that a plurality of layers are integrated with high efficiencies and yield.

2. In the present invention, contains only two steps, simple processes and filming technologies of reflective violet blue gradient films which present rainbow colors in any conditions. The composite violet blue gradient and blue light resistant privacy layer has integrated refraction effects on the basis of existing louver technologies. No matter how strong or weak ambient light conditions are, better spy-proof effects can be achieved.

DESCRIPTION OF THE EMBODIMENTS

The technical solutions in embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without involving creative efforts shall fall within the protection scope of the present invention.

In the description of the present invention, it should be noted that terms "center", "upper", "lower", "left", "right", "vertical", "horizontal", "inner", "outer", etc. indicate orientations or positional relationships based on the orientations or positional relationships shown in the accompanying drawings, which is only for the convenience of describing the present invention and simplifying the description, rather than indicating or implying that the device or element must have a specific orientation or be manufactured or operated in a specific orientation, and therefore should not be construed as limiting the invention; terms "first", "second", "third" are used for descriptive purposes only and should not be construed as indicating or implying relative importance, and unless otherwise clearly stipulated and defined, the terms "installation", "connection" and "connection" should be understood in a broad sense, for example, it may be a fixed connection, a detachable connection, or an integral connection; it may be a mechanical connection or an electrical connection; it can be directly connected, or indirectly connected through an intermediate medium, and it can be internal connection of two components. For those of ordinary skill in the art, the specific meanings of the above terms in the present invention can be understood in specific situations.

Embodiment

Figure 1:
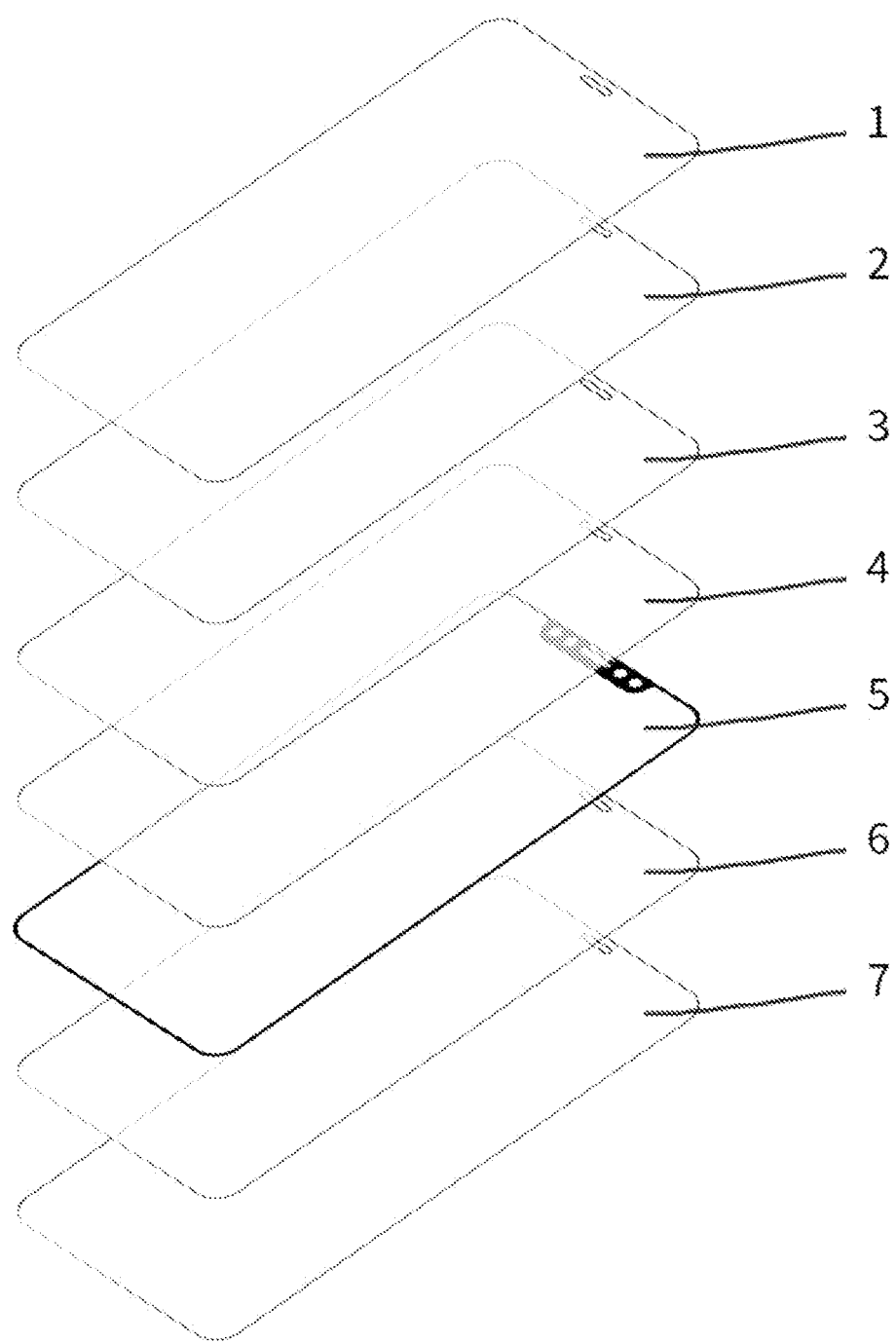
FIG. 1 is an overall structural diagram showing the screen protector of the present invention.
Figure 2:
FIG. 2 is a diagram showing structures inside the composite violet blue gradient and blue light resistant layer in the present invention.
Figure 3:
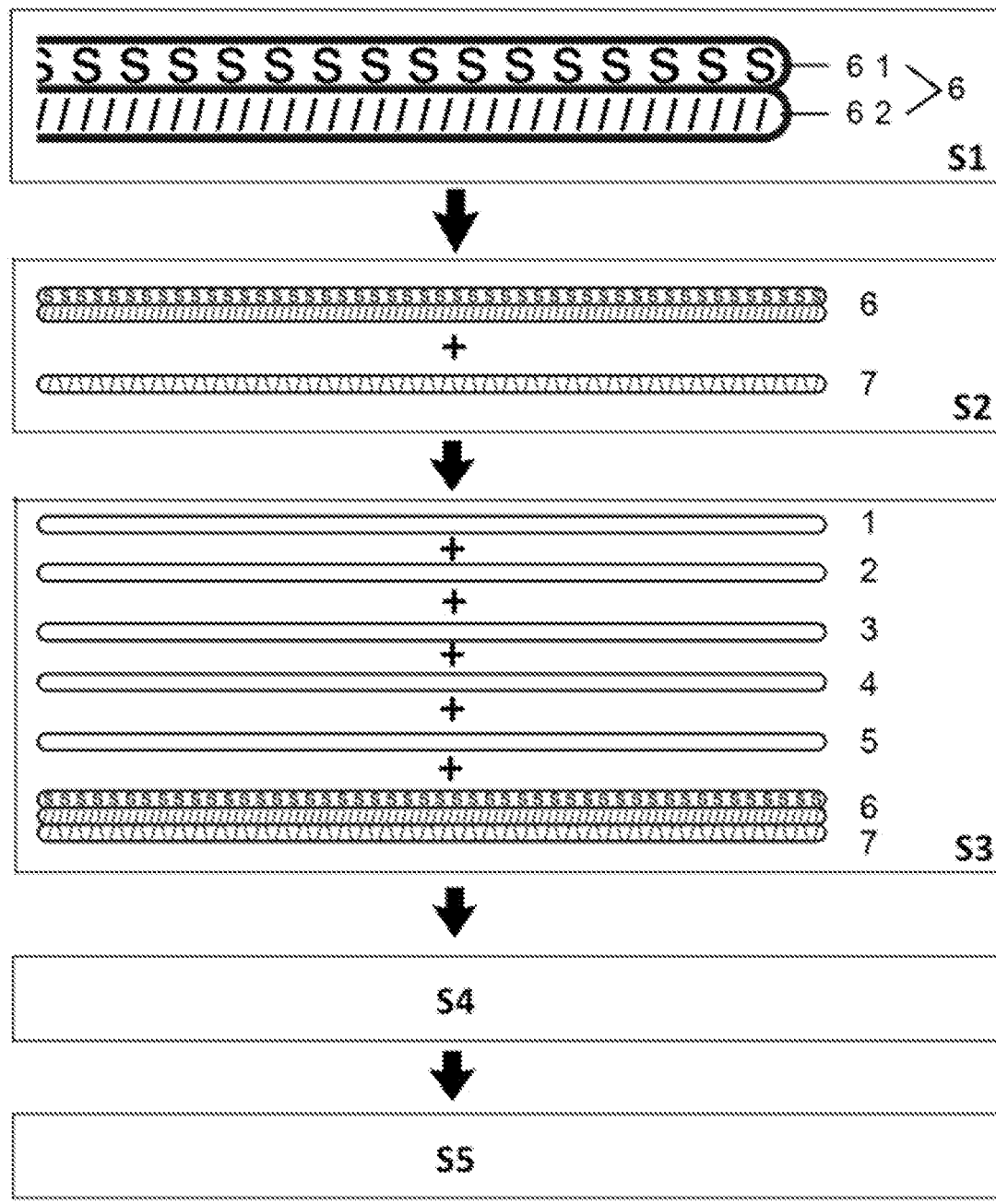
FIG. 3 is a flowchart showing fabrication processes of the screen protector according to the present invention.
Figure 4:
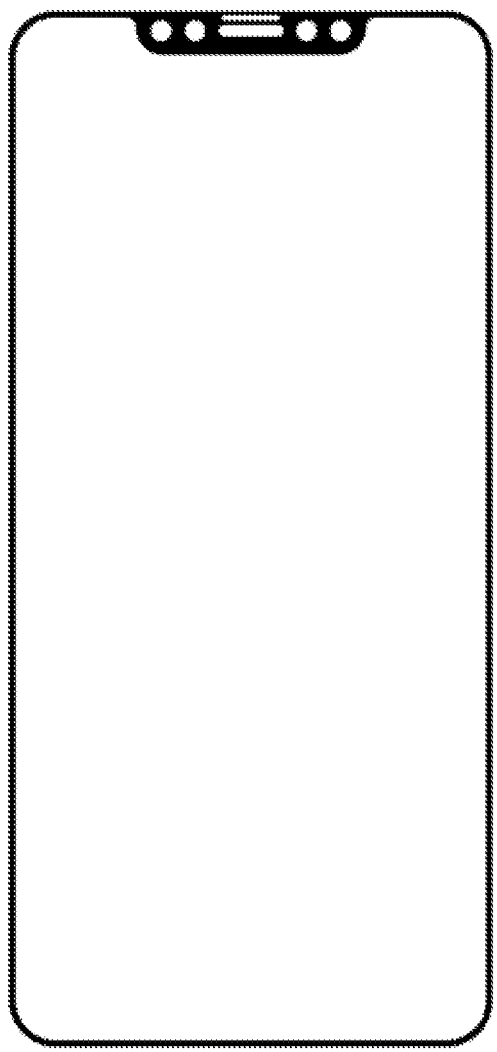
FIG. 4 is a structural diagram showing the silk screen reinforcing layer.
Figure 5:
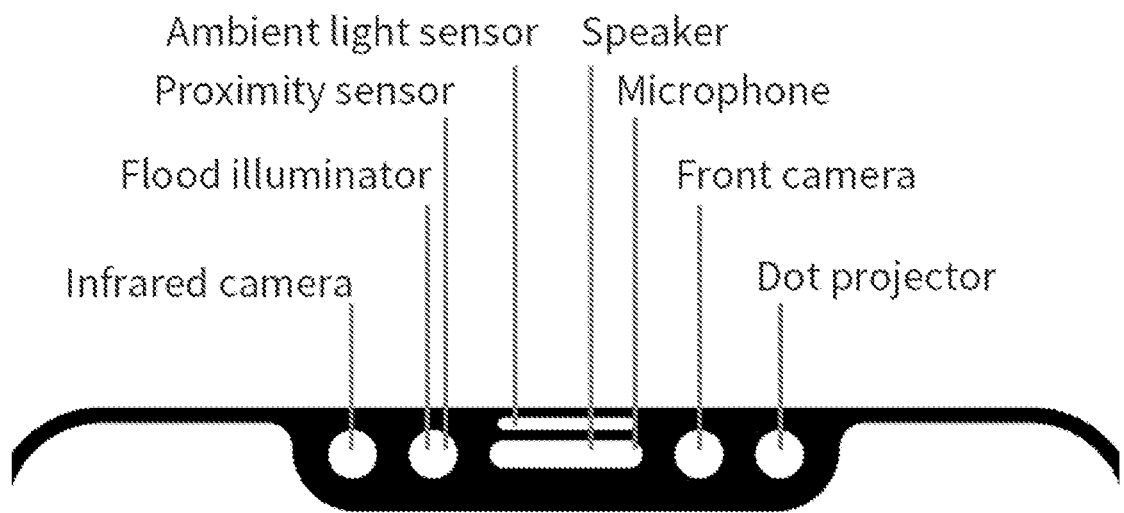
FIG. 5 is a diagram showing openwork in the silk screen reinforcing layer.
Figure 6:
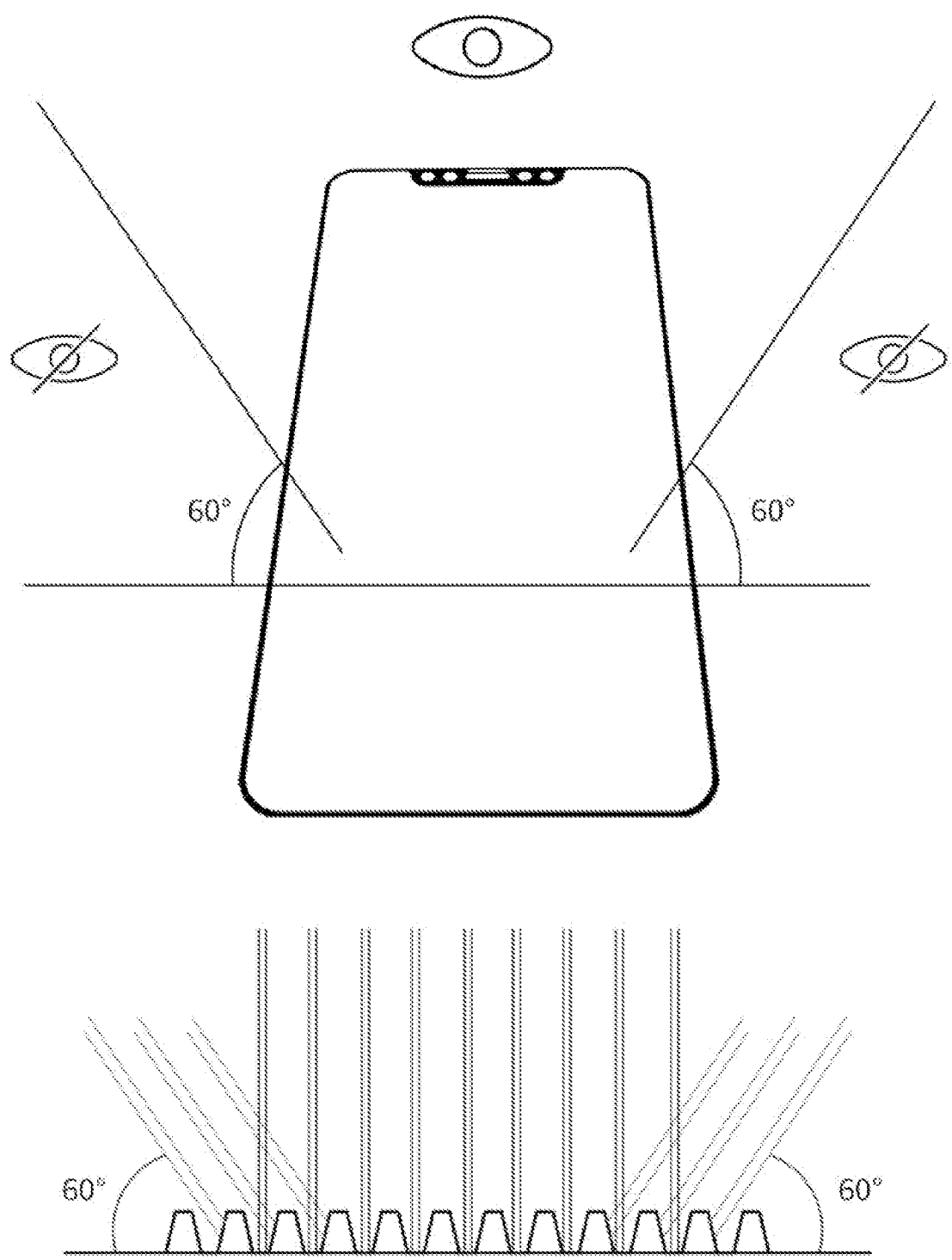
FIG. 6 is a diagram showing the principles of the spy-proof layer.

As shown in FIG. 1 to FIG. 6, an embodiment of the present invention provides a violet blue gradient color, blue light resistant full screen tempered privacy screen protector, comprising an electroplated oleophobic layer 1, a diamond explosion-proof layer 2, a tempered coating 3, a flexible explosion-proof layer 4, a silk screen reinforcing layer 5, a composite violet blue gradient and blue light resistant layer 6 and a spy-proof layer 7.

Wherein the composite violet blue gradient and blue light resistant layer 6 comprises a violet blue gradient film 61 and a blue light resistant film 62.

Fabrication steps of the tempered film are as following:
step S1: coating the violet blue gradient film 61 to the blue light resistant film 62 with a laminating machine to be a composite violet blue gradient and blue light resistant layer 6;
step S2: attaching the composite violet blue gradient and blue light resistant layer 6 with the spy-proof layer by OCAs with the laminating machine;
step S3: bonding a semi-product obtained in step S2 respectively with the silk screen reinforcing layer 5, the flexible explosion-proof layer 4, the tempered coating 3, the diamond explosion-proof layer 2 and the electroplated oleophobic layer 1 to obtain a tempered film;
step S4: cutting the semi-product obtained in step S3 to be different dimensions into different phone sizes with a laser machine; and
step S5: changing a backplane, putting the product into a defoamer to clear bubbles and completing bonding of the entire product.

The electroplated oleophobic layer 1 is placed on an upper surface of the diamond explosion-proof layer 2, wherein the electroplated oleophobic layer 1 can prevent retention of fingerprints on a surface of the film, so as to free the surface from fingerprints and marks of other stains and be more tidy; materials used for the diamond explosion-proof layer 2 are glasses, therefore, the diamond explosion-proof layer 2 is hard, durable and scratch-proof, and it is not likely to have scratching or cracks on the surface; the diamond explosion-proof layer 2 is placed on an upper surface of the tempered coating 3, the tempered coating 3 reinforced a flexible explosion-proof layer 4, therefore, the explosion-proof properties of the film are very strong, explosion and consequent harm to users can be prevented; the tempered coating 3 is made of PET, placed on an upper surface of the flexible explosion-proof layer 4, the flexible explosion-proof layer 4 is configured to increase external pressure resistance and toughness and promise good connection performance, without splashing during smashing; UV adhesives are used for the flexible explosion-proof layer 4, and the flexible explosion-proof layer 4 is provided on an upper surface of the silk screen reinforcing layer 5, wherein the silk screen reinforcing layer 5 covers the screen fully to prevent breakage at edges by increasing harness and toughness of the edges, and promises strength of the edges, silk screen paints are used for the silk screen reinforcing layer 5, the silk screen reinforcing layer 5 is provided on an upper surface of the composite violet blue gradient and blue light resistant layer 6, wherein the composite violet blue gradient and blue light resistant layer 6 is configured to reduce blue ray radiation of mobile phones, so as to reduce damage to eyes resulting from long time mobile phone watching, and when viewing from different angles, the violet blue gradient film has different colors like rainbows; and the spy-proof layer 7 is provided on an upper surface of the composite violet blue gradient and blue light resistant layer 6, and when viewing from an angle of more than 30 degrees, it is not possible to see contents on the mobile phones or the tablets, only rainbow-like colors of the composite violet blue gradient and blue light resistant layer 6 can be seen, therefore, privacy of users can be promised.

Although embodiments of the present invention have been shown and described, it will be understood by those skilled in the art that various changes, modifications, substitutions and modifications can be made in these embodiments without departing from the principle and spirit of the invention and the scope of the present invention is defined by the appended claims and equivalents thereof.

What is claimed is:

1. A violet blue gradient color, blue light resistant and full-screen tempered privacy screen protector, comprising an electroplated oleophobic layer (1), a diamond explosion-proof layer (2), a tempered coating (3), a flexible explosion-proof layer (4), a silk screen reinforcing layer (5), a composite violet blue gradient and blue light resistant layer (6) and a privacy protection layer (7);

wherein the composite violet blue gradient and blue light resistant layer (6) comprises a violet blue gradient film (61) and a blue light resistant film (62);

wherein fabrication processes of the screen protector are as following:

a first step (S1): coating the violet blue gradient film (61) over the blue light resistant film (62) with a laminating machine to form the composite violet blue gradient and blue light resistant layer (6);

a second step (S2): bonding the composite violet blue gradient and blue light resistant layer (6) with the spy-proof layer (7) with the laminating machine by an optical clear adhesives (OCA);

a third step (S3): bonding a semi-product obtained in the second step (S2) respectively with the silk screen reinforcing layer (5), the flexible explosion-proof layer (4), the tempered coating (3), the diamond explosion-proof layer (2) and the electroplated oleophobic layer (2) to form a tempered film;

a fourth step (S4): cutting the semi-product obtained in the third step (S3) to be different dimensions with a laser machine; and a fifth step (S5): changing a backplane, putting the product obtained in the fourth step (S4) into a defoamer to clear bubbles and completing bonding of the product.

2. The violet blue gradient color, blue light resistant and full-screen tempered privacy screen protector according to claim 1, wherein the electroplated oleophobic layer (1) is provided on an upper surface of the diamond explosion-proof layer (2), a material used for the electroplated oleophobic layer (1) is electroplating anti-fingerprint oil and materials used for the diamond explosion-proof layer (2) are glasses.

3. The violet blue gradient color, blue light resistant and full-screen tempered privacy screen protector according to claim 1, wherein the diamond explosion-proof layer (2) is provided on an upper surface of the tempered coating (3), and a material used for the tempered coating (3) is PET.

4. The violet blue gradient color, blue light resistant and full-screen tempered privacy screen protector according to claim 1, wherein the tempered coating (3) is provided on an upper surface of the flexible explosion-proof layer (4), and materials used for the flexible explosion-proof layer (4) are UV adhesives.

5. The violet blue gradient color, blue light resistant and full-screen tempered privacy screen protector according to claim 1, wherein the flexible explosion-proof layer (4) is provided on an upper surface of the silk screen reinforcing layer (5), and materials used for the silk screen reinforcing layer (5) are silk screen paints.

6. The violet blue gradient color, blue light resistant and full-screen tempered privacy screen protector according to claim 1, wherein the silk screen reinforcing layer (5) is provided on an upper surface of the composite violet blue gradient and blue light resistant layer (6), wherein the composite violet blue gradient and blue light resistant layer (6) is made by bonding together the violet blue gradient film and the blue light resistant film.

7. The violet blue gradient color, blue light resistant and full-screen tempered privacy screen protector according to claim 1, wherein the composite violet blue gradient and blue light resistant layer (6) is provided on an upper surface of the spy-proof layer (7), wherein the spy-proof layer (7) is a microlouver style PET film.

* * * * *